United States Patent
Abramson et al.

(10) Patent No.: US 7,680,260 B2
(45) Date of Patent: Mar. 16, 2010

(54) DETECTING A VOICE MAIL SYSTEM ANSWERING A CALL

(75) Inventors: Sandra R. Abramson, Freehold, NJ (US); Stephen M. Milton, Freehold, NJ (US)

(73) Assignee: Avaya Inc., Basking Ridge, NJ (US)

( * ) Notice: Subject to any disclaimer, the term of this patent is extended or adjusted under 35 U.S.C. 154(b) by 1246 days.

(21) Appl. No.: 11/120,781

(22) Filed: May 3, 2005

(65) Prior Publication Data

US 2006/0251222 A1 Nov. 9, 2006

(51) Int. Cl.
*H04M 3/42* (2006.01)

(52) U.S. Cl. .......................... 379/211.02; 379/212.01; 379/88.25

(58) Field of Classification Search ............ 379/211.02, 379/212.01
See application file for complete search history.

(56) References Cited

U.S. PATENT DOCUMENTS

| | | | | |
|---|---|---|---|---|
| 5,048,076 A | * | 9/1991 | Maurer et al. | 379/93.11 |
| 5,056,132 A | * | 10/1991 | Coleman et al. | 379/93.11 |
| 5,371,787 A | | 12/1994 | Hamilton | |
| 5,712,902 A | | 1/1998 | Florence et al. | |
| 5,761,277 A | | 6/1998 | Foladare et al. | |
| 5,771,354 A | * | 6/1998 | Crawford | 709/229 |
| 5,960,064 A | | 9/1999 | Foladare et al. | |
| 6,301,349 B1 | | 10/2001 | Malik | |
| 6,389,130 B1 | * | 5/2002 | Shenoda et al. | 379/221.08 |
| 6,405,051 B1 | | 6/2002 | Ahlström et al. | |
| 6,795,541 B2 | | 9/2004 | Oren | |
| 6,850,602 B1 | | 2/2005 | Chou | |
| 2004/0203678 A1 | | 10/2004 | ManNamara et al. | |

FOREIGN PATENT DOCUMENTS

| | | |
|---|---|---|
| EP | 0255325 A2 | 2/1988 |
| JP | 8023384 A | 1/1996 |
| WO | 0051328 | 8/2000 |
| WO | 2007015552 A1 | 2/2007 |

OTHER PUBLICATIONS

EPO, "EP Application No. 06252314.7 / 1720331 Office Action", Jun. 26, 2008, Published in: EP.
Yl Shuiying, "CN Application No. 200610077248.3 Office Action", Mar. 13, 2009, Publisher: The Patent Office of the People's Republic of China, Published in: CN.
Tillgren, Mattias, "EP Application No. 08172838.8-2414 Search Report", Mar. 27, 2009, Publisher: EPO, Published in: EP.

(Continued)

*Primary Examiner*—Simon Sing
(74) *Attorney, Agent, or Firm*—DeMont & Breyer, LLC (57) ABSTRACT

An apparatus and method are disclosed that enable a private branch exchange to determine that a voice mail system has answered a call, without some of the disadvantages in the prior art. The private branch exchange—or, generally-speaking, a data-processing system—infers that the voice mail system has answered a call by timing key events or by noting some of indications that are received from another system, or both. Subsequently, the private branch exchange drops the voice mail system from the call, thereby minimizing the non-enterprise voice mail system's handling of calls that are originated to an on-premises terminal.

17 Claims, 7 Drawing Sheets

OTHER PUBLICATIONS

Kazio, S., "JP Application No. 2006-128128 Office Action", Nov. 25, 2008, Publisher: JPO, Published in: JP.

Yi Shuiying, "CN Application No. 200610077248.3 Office Action Sep. 5, 2008", , Publisher: SIPO, Published in: CN.

Tillgren, M., "EP Application No. 08172838.8 - 2414 Office Action Jul. 8, 2009",. Publisher: EPO, Published in: EP.

Tillgren, M., "EP Application No. 06252314.7 - 2414 Partial European Search Report Sep. 18, 2006",. Publisher: EPO, Published in: EP.

Tillgren, Mattias, "EP Application No. 08172857.8 - 2414 European Search Report Sep. 24, 2009",. Publisher: EPO, Published in: EP.

Tillgren, Mattias, "EP Application No. 06252314.7 - 2414 Extended European Search Report Nov. 7, 2007",. Publisher: EPO, Published in: EP.

* cited by examiner

DETECTING A VOICE MAIL SYSTEM ANSWERING A CALL

FIELD OF THE INVENTION

The present invention relates to telecommunications in general, and, more particularly, to detecting that a voice mail system has answered a call.

BACKGROUND OF THE INVENTION

Figure 1:
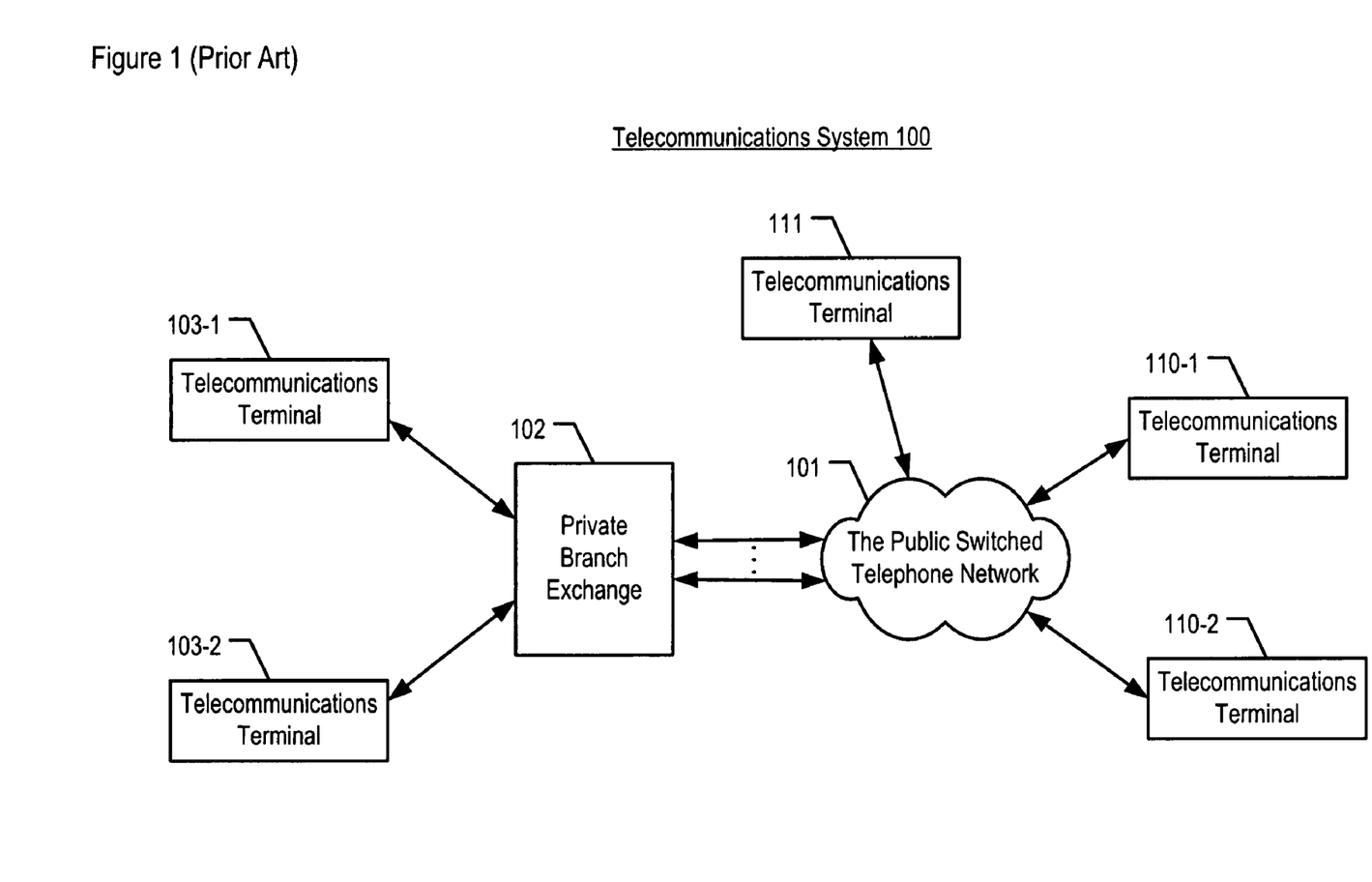
FIG. 1 depicts a schematic diagram of a telecommunications system in the prior art.

FIG. 1 depicts a schematic diagram of a telecommunications system in the prior art. Telecommunications system 100 comprises:

i. the Public Switched Telephone Network, ii. private branch exchange 102, iii. telecommunications terminals 103-1 and 103-2, iv. telecommunications terminals 110-1 and 110-2, and v. telecommunications terminal 111;

all of which are interconnected as shown.

The Public Switched Telephone Network (i.e., element 101) is a complex of telecommunications equipment that is owned and operated by different entities throughout the World. In the United States of America, for example, the Public Switched Telephone Network (or "PSTN") comprises an address space that is defined by ten digits, and, therefore, comprises 10 billion unique addresses or "telephone numbers." The Public Switched Telephone Networks in other countries are similar.

The Public Switched Telephone Network provides telecommunications service to telecommunications terminals 110-1, 110-2, and 111. Telecommunications terminals 110-1, 110-2, and 111 can be either wireline terminals or wireless terminals, or a combination of both.

Private branch exchange 102 is capable of switching incoming calls (e.g., from terminal 111, etc.) from the Public Switched Telephone Network via one or more transmission lines to terminals 103-1 and 103-2. Private branch exchange 102 is also capable of handling outgoing calls from terminals 103-1 and 103-2 to the Public Switched Telephone Network via one or more transmission lines.

Private branch exchange 102 is capable of also extending an incoming call (e.g., from terminal 111, etc.) to a telephone number of an "off-premises" terminal in the Public Switched Telephone Network, in addition to switching the same incoming call to an "on-premises terminal" within the enterprise area (e.g., an office building, etc.) that is served by exchange 102. Terminals 103-1 and 103-2 are considered to be on-premises terminals with respect to private branch exchange 102, while terminals 110-1 and 110-2 are considered to be off-premises terminals.

To accomplish the switching of an incoming, enterprise-related call to one of on-premises terminals 103-1 and 103-2, and the extending of the call to one of off-premises terminals 110-1 and 110-2, private branch exchange 102 maintains a table that correlates the off-premises telephone number to the on-premises, private branch exchange (PBX) extension. Table 1 depicts a table that illustrates the correlation.

TABLE 1

PBX Extension-to-PSTN Number Database

| On-Premises Telecommunications Terminal | Private Branch Exchange Extension | Telecommunications Network Number |
|---|---|---|
| 103-1 | 732-555-0102, x11 | 201-555-1236 |
| 103-2 | 732-555-0102, x12 | 908-555-3381 |
| ... | ... | ... |

As an example, a caller at terminal 111 who wishes to reach the PBX user of terminal 103-1 dials the PBX number (i.e., 732-555-0102). Private branch exchange 102 receives the incoming call, including the extension number (i.e., x11). Using information stored in memory and similar to what is shown in Table 1, private branch exchange 102 determines that the call is also to be extended to off-premises telephone number 201-555-1236, associated with terminal 110-1. The off-premises number corresponds to the off-premises terminal (e.g., a cellular phone, a home phone, etc.) that belongs to the PBX user of terminal 103-1. The idea behind transmitting the call to both terminal 103-1 and 110-1 is that if the PBX user is not reachable at his office phone (i.e., terminal 103-1), then maybe he is reachable at a phone that is outside of the office (i.e., terminal 110-1).

One problem that can occur, however, is that the extended call might ultimately be routed to a voice mail system (i.e., a non-enterprise system) that is not associated with private branch exchange 102. For example, if private branch exchange 102 attempts to reach cellular terminal 110-1, the cellular voice mail system of cellular terminal 110-1 might instead answer the call. Consequently, some calls that are made to the PBX user might go to the non-enterprise voice mail system. Meanwhile, other calls that are made to the PBX user might still go to the PBX voice mail system (i.e., the enterprise system), such as when the PBX user disables the call-extending feature when the feature is not needed. It is undesirable for enterprise-related calls to end up in the non-enterprise voice mail system because it burdens the PBX user with having to retrieve voice mail from multiple systems. Also, when accessing the non-enterprise voice mail system, the PBX user is inconvenienced with having to sort out the personal calls that were made directly to the user's off-premises terminal from the enterprise-related calls that were routed from the PBX.

What is needed is a technique to minimize the handing of enterprise-related calls by non-enterprise voice mail systems, without some of the disadvantages in the prior art.

SUMMARY OF THE INVENTION

The present invention enables a private branch exchange to determine that a voice mail system has answered a call, without some of the disadvantages in the prior art. The private branch exchange—or, generally-speaking, a data-processing system—infers that the voice mail system has answered a call by timing key events or by noting some of indications that are received from another system, or both. Subsequently, the private branch exchange drops the voice mail system from the call, thereby minimizing the non-enterprise voice mail system's handling of calls that are originated to an on-premises terminal.

In a first technique, the private branch exchange determines that a voice mail system has answered a call by basing the determination on a time interval, in accordance with the illustrative embodiment of the present invention. As an example, consider an off-premises terminal that is associated with a cellular network. Normally, if the terminal cannot be contacted (e.g., is turned off, etc.), the terminal's cellular service provider immediately sends the call to the cellular voice mail system. Conversely, if the call is routed into the cellular network and that network is able to reach the terminal, there is typically a several-second delay before the call is answered. Therefore, in accordance with the illustrative embodiment, if the private branch exchange receives an answer indication in less than a pre-determined time, such as four seconds, the private branch exchange assumes that the call has been answered by the cellular voice mail system.

In a second technique, the private branch exchange determines that a voice mail system has answered a call by basing the determination on message protocols, in accordance with the illustrative embodiment of the present invention. As an example, consider an off-premises terminal that is associated with a cellular network that interacts with its cellular terminals via an end-to-end, Integrated Services Digital Network (ISDN) call model. If the private branch exchange receives an indication that the call has been answered by an endpoint outside the ISDN call model, the private branch exchange assumes that the call has been answered by the cellular voice mail system because cellular voice mail systems often operate in accordance with a non-ISDN protocol.

The private branch exchange of the illustrative embodiment is also capable of selecting a criterion for determining that a voice mail system has answered the call, wherein the selection of the criterion is based on the called telecommunications terminal. For example, if the called terminal operates in accordance with a first protocol type, then the selected criterion is time-interval-based; if, however, the terminal operates in accordance with a second protocol type, then the selected criterion is message-protocol-based.

Once the private branch exchange determines that a non-enterprise voice mail system has answered a call made to an on-premises terminal, the exchange handles the call accordingly. The private branch exchange can drop the "leg" of the call that was extended to the off-premises terminal, it can continue to wait for an answer from the on-premises terminal, or it can send the call to the enterprise voice mail system, alone or in combination.

The illustrative embodiment of the present invention is advantageous over some of the techniques in the prior art. The private branch exchange user, in one technique in the prior art, would have to turn off his cellular voice mail service for all calls, personal and otherwise, to prevent the extended call from going to the cellular voice mail system. In contrast, the illustrative embodiment of the present invention attempts to detect when the cellular voice mail system is answering the extended call, thereby avoiding: (i) the imposition on the user, and (ii) the fallibility of relying on the user to take action.

The illustrative embodiment of the present invention comprises: transmitting, from a first data-processing system, a call to a second data-processing system; receiving, at the first data-processing system, an indication from the second data processing system that the call has been answered; and ending, at the first data-processing system, the call to the second data processing system based on the time interval between: (i) when the call is transmitted to the second data processing system, and (ii) when the indication is received by the first data processing system that the call has been answered.

DETAILED DESCRIPTION

Figure 2:
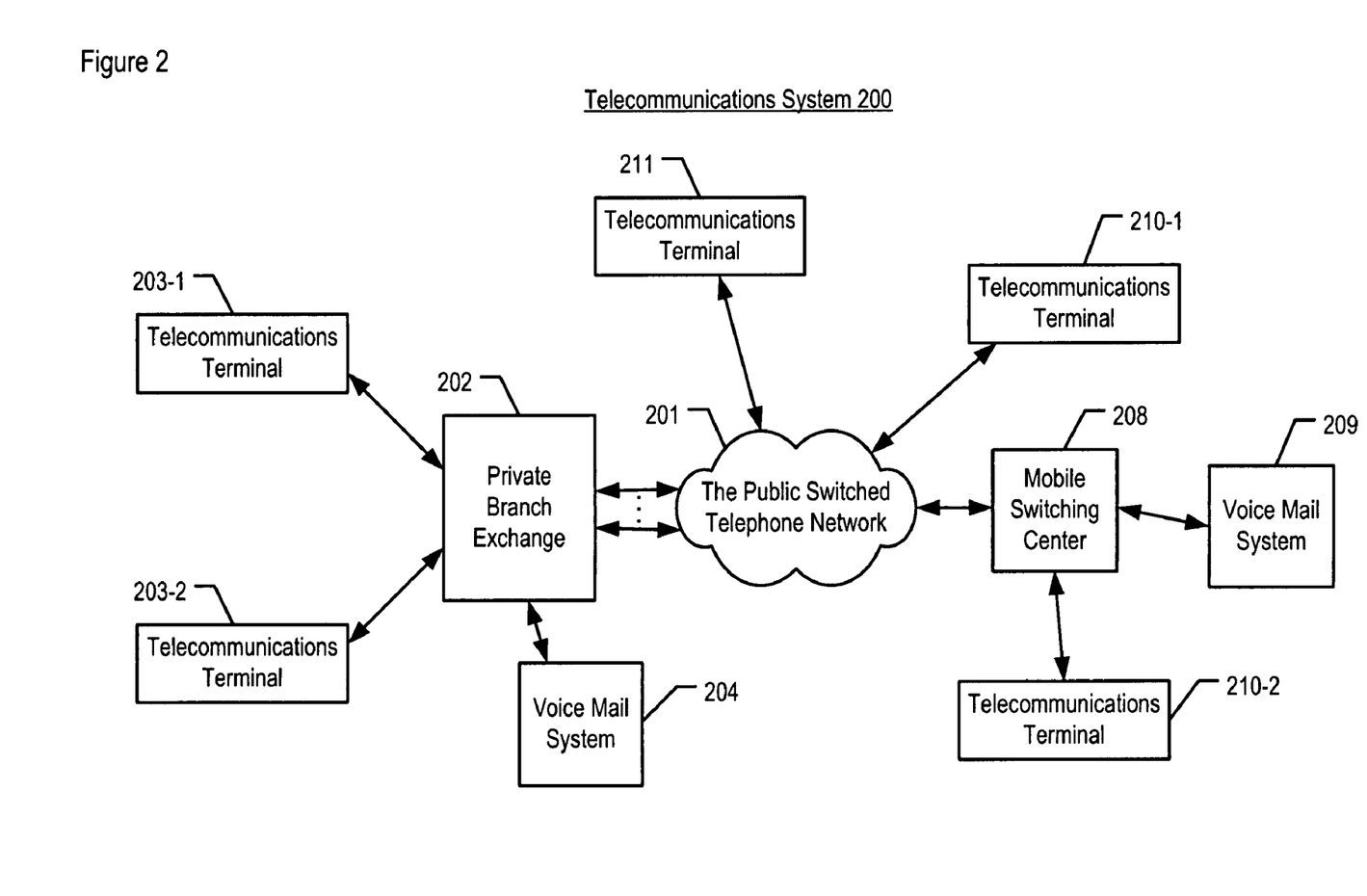
FIG. 2 depicts a schematic diagram of a telecommunications system, in accordance with the illustrative embodiment of the present invention.

FIG. 2 depicts a schematic diagram of a telecommunications system, in accordance with the illustrative embodiment of the present invention. Telecommunications system 200 comprises:
  i. the Public Switched Telephone Network,
  ii. private branch exchange 202,
  iii. telecommunications terminals 203-1 and 203-2,
  iv. voice mail system 204,
  v. mobile switching center 208,
  vi. cellular voice mail system 209,
  vii. telecommunications terminals 210-1 and 210-2, and
  viii. telecommunications terminal 211;
all of which are interconnected as shown.

The Public Switched Telephone Network (i.e., element 201) provides telecommunications service to wireline telecommunications terminals 210-1 and 211, and interconnects multiple telecommunications networks, such as the enterprise network served by private branch exchange 202 and the wireless cellular network served by mobile switching center 208. The enterprise network served by private branch exchange 202 provides telecommunications service to associated telecommunications terminals, including wireline terminals 203-1 and 203-2. The cellular network served by mobile switching center 208 provides telecommunications service to wireless telecommunications terminals, including terminal 210-2.

It will be clear to those skilled in the art, after reading this disclosure, how to make and use alternative embodiments of the present invention in which some or all of the telecommunications terminals are wireline or some or all are wireless.

Private branch exchange 202 is a data-processing system, the salient components of which are described below and with respect to FIG. 3. Private branch exchange 202 is capable of switching incoming calls (e.g., from terminal 211, etc.) from the Public Switched Telephone Network via one or more transmission lines to terminals 203-1 and 203-2. Private branch exchange 202 is also capable of handling outgoing calls from terminals 203-1 and 203-2 to the Public Switched Telephone Network via one or more transmission lines (e.g., Integrated Services Digital Network trunks, etc.).

Private branch exchange 202 is capable of also extending an incoming call (e.g., from terminal 211, etc.) to a telephone number of an "off-premises" terminal in the Public Switched Telephone Network, in addition to switching the same incoming call to an "on-premises terminal" within the enterprise area (e.g., an office building, etc.) that is served by exchange 202. Terminals 203-1 and 203-2 are considered to be on-premises terminals, while terminals 210-1 and 210-2 are considered to be off-premises terminals with respect to private branch exchange 202. It will be clear to those skilled in the art, after reading this disclosure, how to make and use alternative embodiments of the present invention in which private branch exchange 202 provides telecommunications service to different numbers of terminals 203 and terminals 210 than those depicted.

In addition, private branch exchange 202 is capable of performing the tasks described below and with respect to FIGS. 4 through 7. Although the illustrative embodiment teaches that a private branch exchange performs the described tasks, it will be clear to those skilled in the art, after reading this disclosure, how to make and use the alternative embodiments of the present invention in which, for example, the tasks are performed by a switch or another type of data-processing system within the Public Switched Telephone Network or another type of network. In other words, the present invention is equally well-suited for implementation in public and private telecommunications systems and in wireline and wireless systems as well.

Voice mail system 204 is a system for storing voice messages in well-known fashion. Voice mail system 204 is associated with private branch exchange 202 and provides the enterprise voice mail system for one or more users of terminals 203. It will be clear to those skilled in the art how to make and use voice mail system 204.

Mobile switching center 208 is capable of switching incoming calls from the Public Switched Telephone Network via one or more transmission lines to wireless terminal 210-2. Mobile switching center 208 is also capable of handling outgoing calls from terminal 210-2 to the Public Switched Telephone Network via one or more transmission lines. Mobile switching center 208 communicates with terminal 210-2 via one or more radio base stations, in well-known fashion. It will be clear to those skilled in the art how to make and use mobile switching center 208.

Voice mail system 209 is a system for storing voice messages in well-known fashion. Voice mail system 209 is associated with mobile switching center 208 and provides the cellular voice mail system for one or more users of terminals 210. It will be clear to those skilled in the art how to make and use voice mail system 209.

Figure 3:
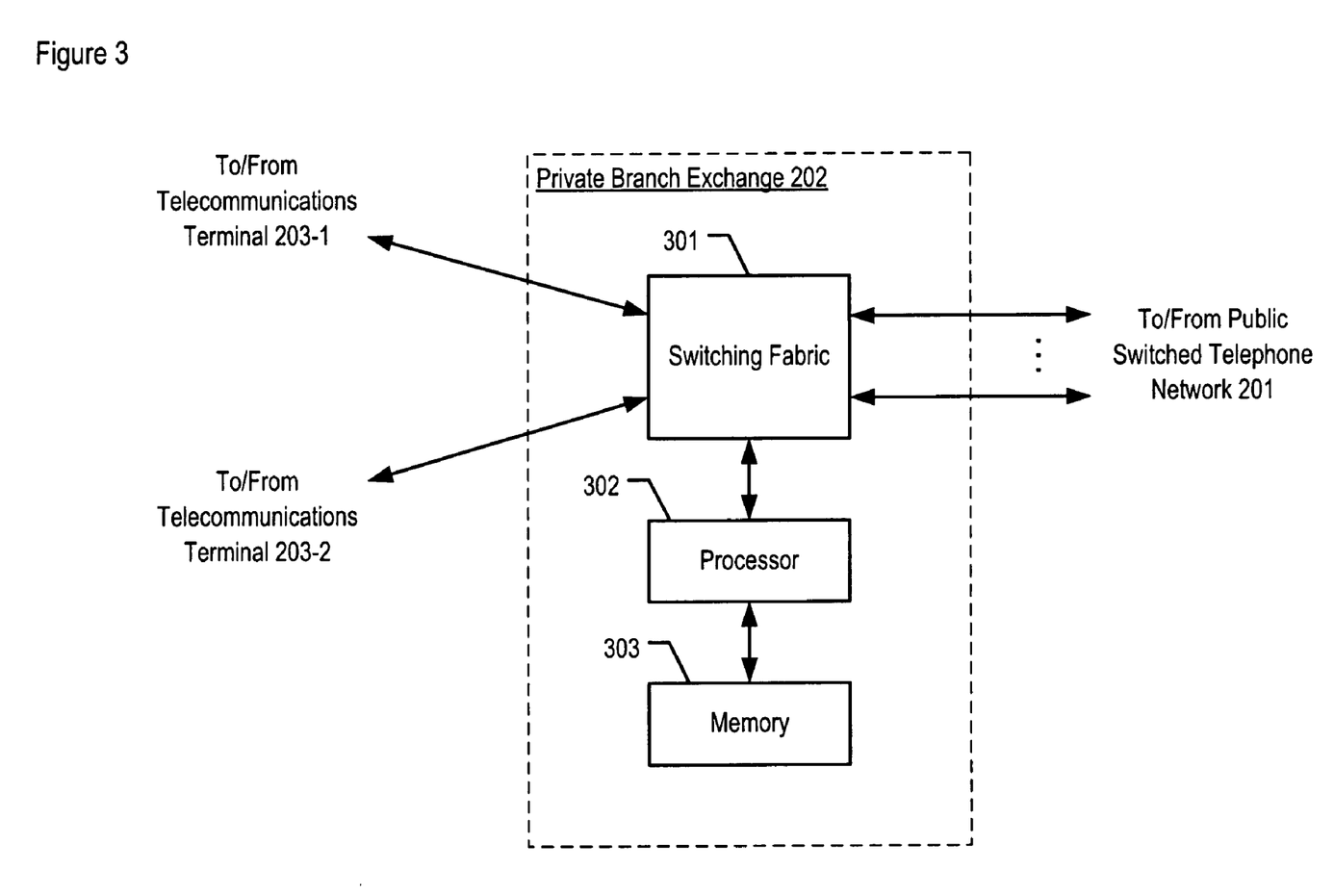
FIG. 3 depicts a block diagram of the salient components of private branch exchange 202 in accordance with the illustrative embodiment of the present invention.

FIG. 3 depicts a block diagram of the salient components of private branch exchange 202 in accordance with the illustrative embodiment of the present invention. Private branch exchange 202 comprises: switching fabric 301, processor 302, and memory 303, interconnected as shown.

Switching fabric 301 is capable of performing all of the tasks described below and with respect to FIGS. 4 through 7 under the direction of processor 302. It will be clear to those skilled in the art, after reading this disclosure, how to make and use switching fabric 301.

Processor 302 is a general-purpose processor that is capable of receiving called-related data from switching fabric 301, of reading data from and writing data to memory 303, and of executing the tasks described below and with respect to FIGS. 4 through 7. In some alternative embodiments of the present invention, processor 302 might be a special-purpose processor. In either case, it will be clear to those skilled in the art, after reading this disclosure, how to make and use processor 302.

Memory 303 is a non-volatile random-access memory that stores the instructions and data used by processor 302. Memory 303 stores the private branch exchange extension and affiliated PSTN telephone number for each PBX user, which are shown in Table 1. In some embodiments, memory 303 also stores the protocol type of the telecommunications terminal (e.g., terminal 210-2, etc.) associated with the PSTN telephone number. Protocol type is described below and with respect to FIG. 7. It will be clear to those skilled in the art, after reading this disclosure, how to make and use memory 303.

Figure 4:
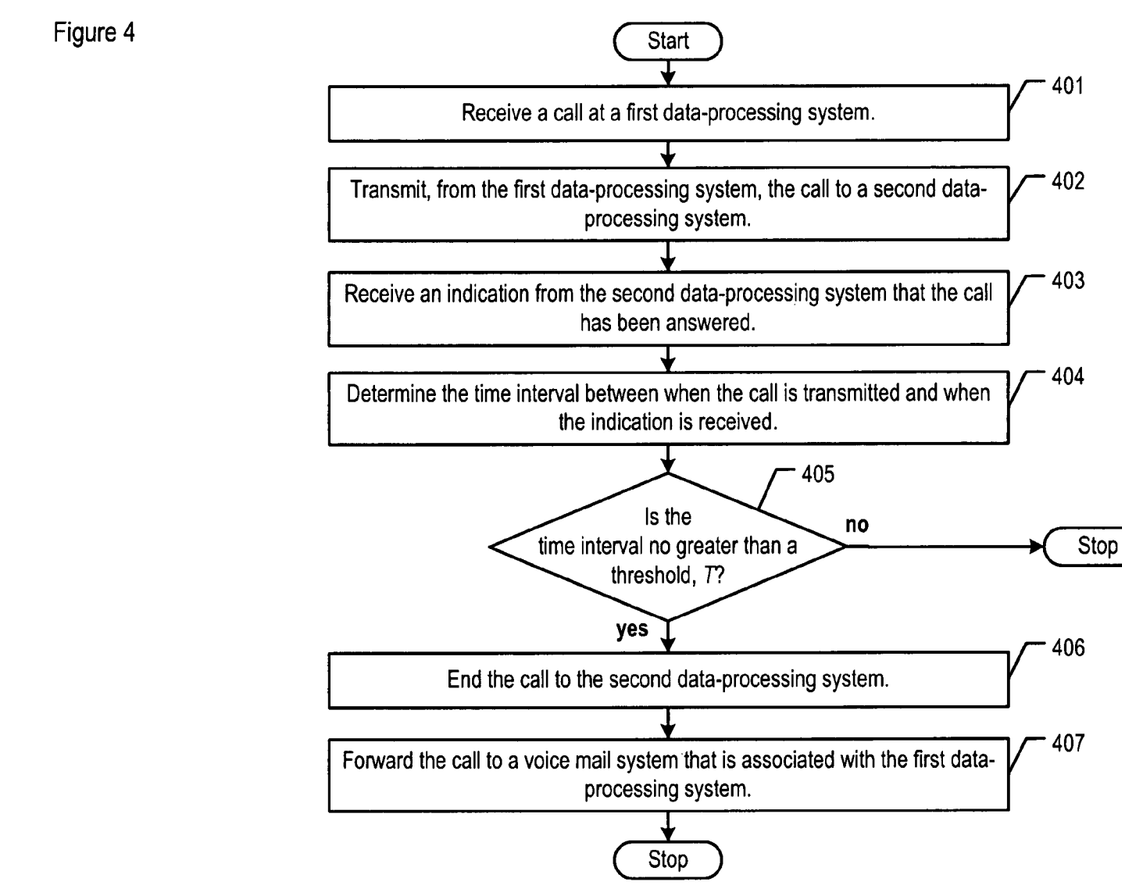
FIG. 4 depicts a flowchart of the salient tasks associated with determining, based on time interval, that a voice mail system has answered a call, in accordance with the illustrative embodiment of the present invention.

FIG. 4 depicts a flowchart of the salient tasks associated with determining, based on time interval, that a voice mail system has answered a call, in accordance with the illustrative embodiment of the present invention. It will be clear to those skilled in the art which tasks depicted in FIG. 4 can be performed simultaneously or in a different order than that depicted.

At task 401, a first-data processing system receives an incoming call (e.g., from terminal 211, etc.) in well-known fashion. For the purpose of teaching the tasks described with respect to FIG. 4, the first data-processing system is represented by private branch exchange 202, in accordance with the illustrative embodiment of the present invention.

Private branch exchange 202 determines, in well-known fashion, that the incoming call is to be extended to both an on-premises terminal (i.e., one of terminals 203) and an off-premises terminal (i.e., one of terminals 210). For the purpose of teaching the described tasks, it is assumed that private branch exchange 202 selects on-premises terminal 203-2 and off-premises terminal 210-2 to which to extend the call.

As part of extending the call to terminal 210-2, at task 402 private branch exchange 202 transmits the call to a second data-processing system, in well-known fashion. For the purpose of teaching the described tasks, the second data-processing system is represented by mobile switching center 208, in accordance with the illustrative embodiment of the present invention. Private branch exchange 202 remembers, in well-known fashion, the time at which the call is transmitted to mobile switching center 208.

At task 403, private branch exchange 202 receives an indication from mobile switching center 208 that the call has been answered. For example, the call might have been answered by telecommunications terminal 210-2 or by cellular voice mail system 209, in well-known fashion. Private branch exchange 202 remembers, in well-known fashion, the time at which the answer indication is received from mobile switching center 208.

At task 404, private branch exchange 202 determines the time interval between when the call was transmitted to mobile switching center 208 and when the indication was received that the call had been answered. To determine the time interval, private branch exchange 202 calculates the difference between the two times that were remembered as part of tasks 402 and 403, in accordance with the illustrative embodiment of the present invention. As those who are skilled in the art will appreciate, other methods can be used to determine the time interval.

At task 405, private branch exchange 202 checks whether the time interval is no greater than a threshold, T. The value of T can be fixed in software, adjusted by a user (e.g., a system administrator, etc.) of private branch exchange 202, based on other parameters in telecommunications system 200, and so forth. For example, in some embodiments, the value can be based on (i) the protocol type of the terminal to which the call is being extended or (ii) the service network of the terminal to which the call is being extended (e.g., the cellular network served by mobile switching center 208, etc.). It will be clear to those skilled in the art, after reading this disclosure, how to select a suitable value for T.

If the time interval is no greater than T, task execution proceeds to task 406. Otherwise, task execution ends.

At task 406, private branch exchange 202 ends the call to mobile switching center 208. In other words, private branch exchange 202 "drops the leg" of the call that exchange 202 extended to off-premises terminal 210-2. Private branch exchange 202 then continues to monitor whether or not on-premises terminal 203-2 answers the call.

At task 407, private branch exchange 202 optionally forwards the call to a voice mail system (e.g., voice mail system 204, etc.) that is associated with exchange 202. For example, private branch exchange 202 might ultimately forward the call to voice mail if on-premises terminal 203-2 does not answer the call.

Figure 5A:
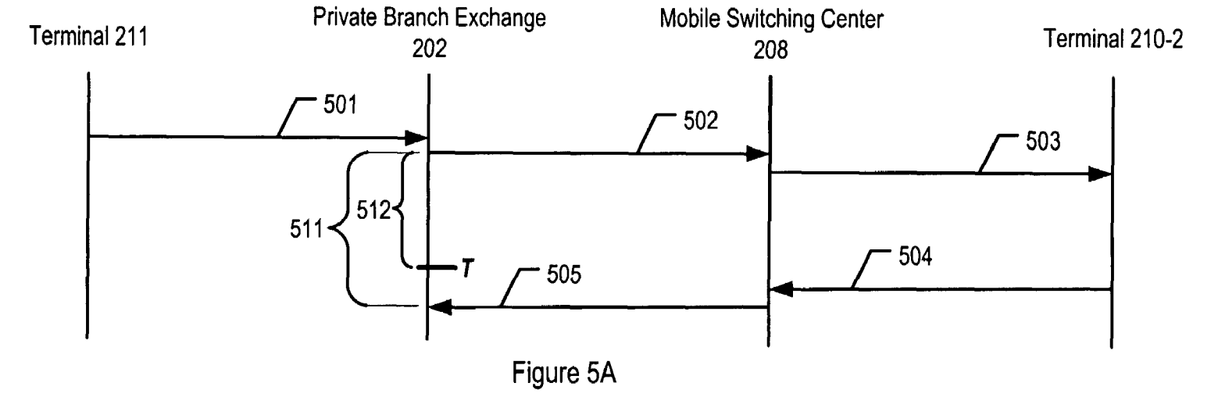
FIGS. 5A and 5B depict an illustrative example of determining, based on time, whether or not a non-enterprise voice mail system has answered a call.
Figure 5B:
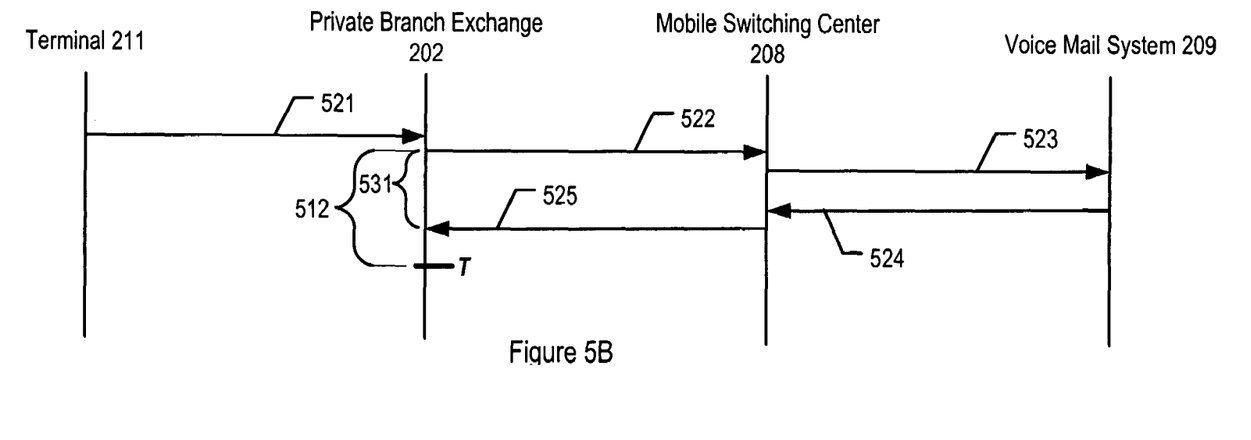

FIGS. 5A and 5B depict an illustrative example of determining, based on time, whether or not a non-enterprise voice mail system has answered a call. FIG. 5A depicts a scenario in which terminal 210-2 answers the call. FIG. 5B depicts a scenario in which voice mail system 209 answers the call.

In FIG. 5A, terminal 211 transmits call setup message 501 to private branch exchange 202 in well-known fashion. Call setup message 501 corresponds to an incoming call. Upon receiving message 501, private branch exchange 202 transmits call setup message 502 to mobile switching center 208 for the purpose of extending the call to off-premises terminal 210-2.

Mobile switching center 208 checks, in well-known fashion, if terminal 210-2 is available to receive the call and determines that terminal 210-2 is available. As a result, switching center 208 transmits message 503 to send the call to terminal 210-2. Switching center 208 then receives answer message 504 from terminal 210-2 and sends answer indication 505 to private branch exchange 202.

Private branch exchange 202 determines time interval 511, which is the difference in time between (i) when exchange 202 transmitted the call to mobile switching center 208, and (ii) when exchange 202 received the indication that the call had been answered. Exchange 202 compares time interval 511 to threshold 512 and determines that time interval 511 is greater than the value of threshold 512. Therefore, private branch exchange 202 concludes that terminal 210-2 has answered the call and allows terminal 210-2 to continue handling the call.

In FIG. 5B, terminal 211 transmits call setup message 521 to private branch exchange 202 in well-known fashion. Upon receiving message 521, private branch exchange 202 transmits call setup message 522 to mobile switching center 208 for the purpose of extending the call to off-premises terminal 210-2.

Mobile switching center 208 checks, in well-known fashion, if terminal 210-2 is available to receive the call and determines that terminal 210-2 is unavailable. For example, terminal 210-2 might be powered off, might not have returned a response to paging, might not be able to be set up on a traffic channel, and so forth. As a result, switching center 208 transmits message 523 to send the call to cellular voice mail system 209. Switching center 208 then receives answer message 524 from voice mail system 209 and then sends answer indication 525 to private branch exchange 202.

Private branch exchange 202 determines time interval 531, which is the difference in time between (i) when exchange 202 transmitted the call to mobile switching center 208, and (ii) when exchange 202 received the indication that the call had been answered. Exchange 202 compares time interval 531 to threshold 512 and determines that time interval 531 is no greater than the value of threshold 512. Therefore, private branch exchange 202 concludes that terminal 210-2 did not answer the call, ends the call to voice mail system 209, and continues handling the call within its enterprise network.

Time interval 531 is shorter than time interval 511 because it generally takes longer to page terminal 210-2, set terminal 210-2 up on a traffic channel, and receive an indication that terminal 210-2's user has answered the call than it does to determine that terminal 210-2 is unavailable to answer the call. The difference in time intervals is used in accordance with the illustrative embodiment of the present invention to determine if non-enterprise voice mail system 209 answers the call.

Figure 6:
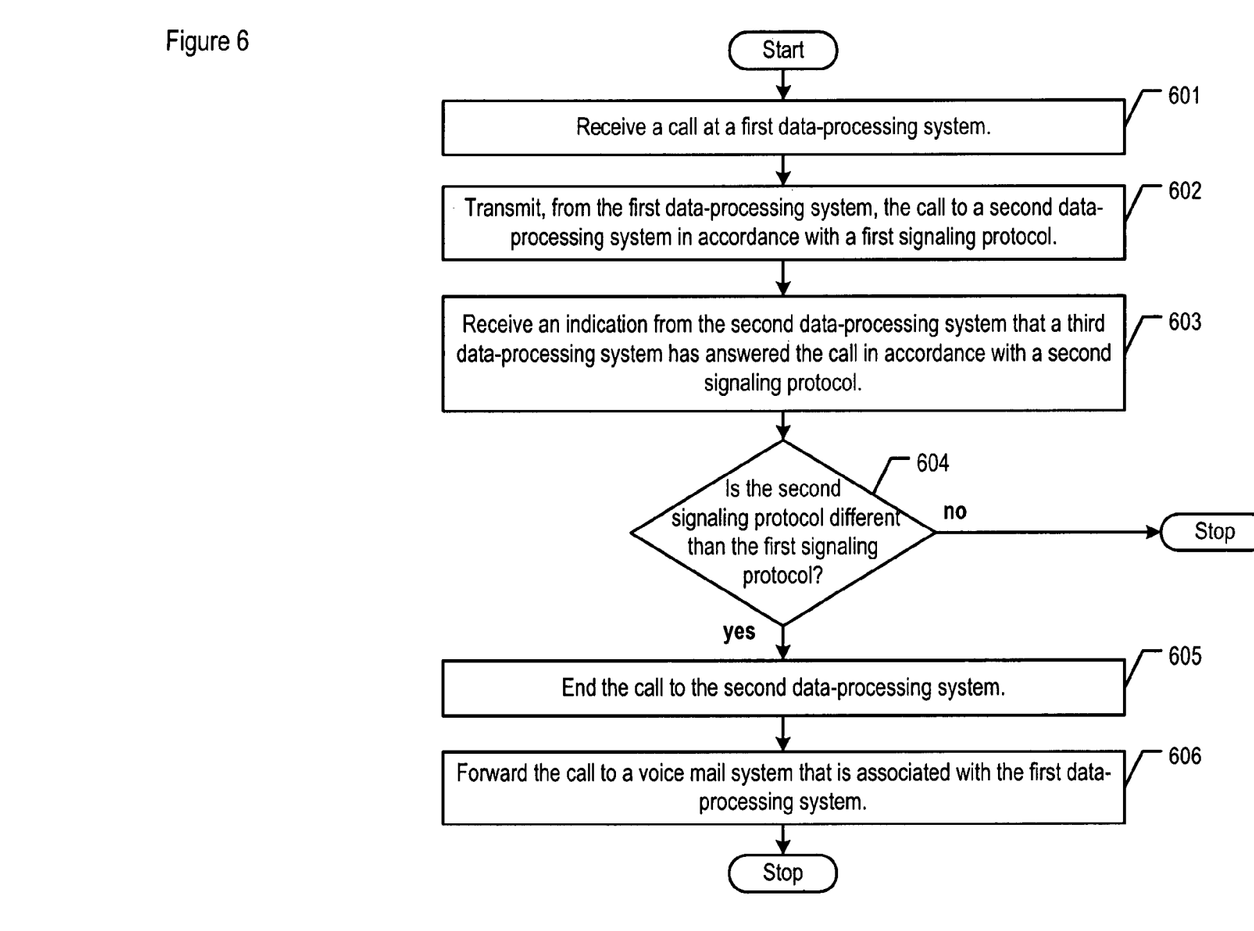
FIG. 6 depicts a flowchart of the salient tasks associated with determining, based on message protocols, that a voice mail system has answered a call, in accordance with the illustrative embodiment of the present invention.

FIG. 6 depicts a flowchart of the salient tasks associated with determining, based on message protocols, that a voice mail system has answered a call, in accordance with the illustrative embodiment of the present invention. It will be clear to those skilled in the art which tasks depicted in FIG. 6 can be performed simultaneously or in a different order than that depicted.

At task 601, a first-data processing system receives an incoming call (e.g., from terminal 211, etc.) in well-known fashion. For the purpose of teaching the tasks described with respect to FIG. 6, the first data-processing system is represented by private branch exchange 202, in accordance with the illustrative embodiment of the present invention.

Private branch exchange 202 determines, in well-known fashion, that the incoming call is to be extended to both an on-premises terminal (i.e., one of terminals 203) and an off-premises terminal (i.e., one of terminals 210). For the purpose of teaching the described tasks, it is assumed that private branch exchange 202 selects on-premises terminal 203-2 and off-premises terminal 210-2 to which to extend the call.

As part of extending the call to terminal 210-2, at task 602 private branch exchange 202 transmits the call to a second data-processing system, in well-known fashion. For the purpose of teaching the described tasks, the second data-processing system is represented by mobile switching center 208, in accordance with the illustrative embodiment of the present invention. Private branch exchange 202 transmits the call to mobile switching center 208 using a first signaling protocol. In accordance with the illustrative embodiment of the present invention, the first signaling protocol used is based on the Integrated Services Digital Network (IDSN) set of protocols, as is well-known in the art. It will be clear to those skilled in the art, after reading this disclosure, how to make and use alternative embodiments of the present invention that use other signaling protocols (e.g., Session Initiation Protocol, etc.).

Optionally, private branch exchange 202 remembers, in well-known fashion, the time at which the call is transmitted to mobile switching center 208.

At task 603, private branch exchange 202 receives an indication from mobile switching center 208 a third data-processing system has answered the call in accordance with a second signaling protocol. For example, telecommunications terminal 210-2 or cellular voice mail system 209 might have answered the call, in well-known fashion.

In accordance with the illustrative embodiment, the indication is received as part of an ISDN CONNECT message and specifies that the off-premises-extended call either is or is not being handled end-to-end as an ISDN call (i.e., a call in accordance with the first protocol). The second protocol used to answer the call can be ISDN-based, proprietary protocol-based, and so forth.

Optionally, private branch exchange 202 remembers, in well-known fashion, the time at which the answer indication is received from mobile switching center 208.

At task 604, private branch exchange 202 checks whether the second signaling protocol is different than the first signaling protocol. If the second signaling protocol is different than the first signaling protocol (e.g., proprietary-based versus ISDN-based, etc.), then task execution proceeds to task 605. Otherwise, task execution ends.

As an example, private branch exchange 202 has transmitted the call to a mobile switching center that is based on the Global System for Mobile Communications (GSM) set of protocols, as is well-known in the art. GSM, along with some other cellular protocols (e.g., Integrated Digital Enhanced Network [iDEN], etc.), is based on an ISDN end-to-end call model. If the returned ISDN CONNECT message indicates that the call has been answered by an ISDN endpoint, it is inferred that a GSM cellular terminal (e.g., terminal 210-2, etc.) has answered the call. If, however, the returned ISDN CONNECT message indicates that the call has not been answered by an ISDN endpoint, it is inferred that a voice mail system, typically proprietary protocol-based, has answered the call.

At task 605, private branch exchange 202 ends the call to mobile switching center 208. In other words, private branch exchange 202 "drops the leg" of the call that exchange 202 extended to off-premises terminal 210-2. Private branch exchange 202 then continues to monitor whether or not on-premises terminal 203-2 answers the call.

At task 606, private branch exchange 202 optionally forwards the call to a voice mail system (e.g., voice mail system 204, etc.) that is associated with exchange 202. For example, private branch exchange 202 might ultimately forward the call to voice mail if on-premises terminal 203-2 does not answer the call.

In some alternative embodiments, the ending of the call to mobile switching center 208 can also be based on the time interval between: (i) when the call is transmitted to switching center 208, and (ii) when the indication is received by private branch exchange 202 that the call has been answered. For example, if mobile switching center 208 returns a message that indicates that the call has been answered, but does not return an ISDN CONNECT message (i.e., a message with a protocol-related answer indication), then private branch exchange 202 can execute time-based tasks 404 through 407, described above and with respect to FIG. 4.

Figure 7:
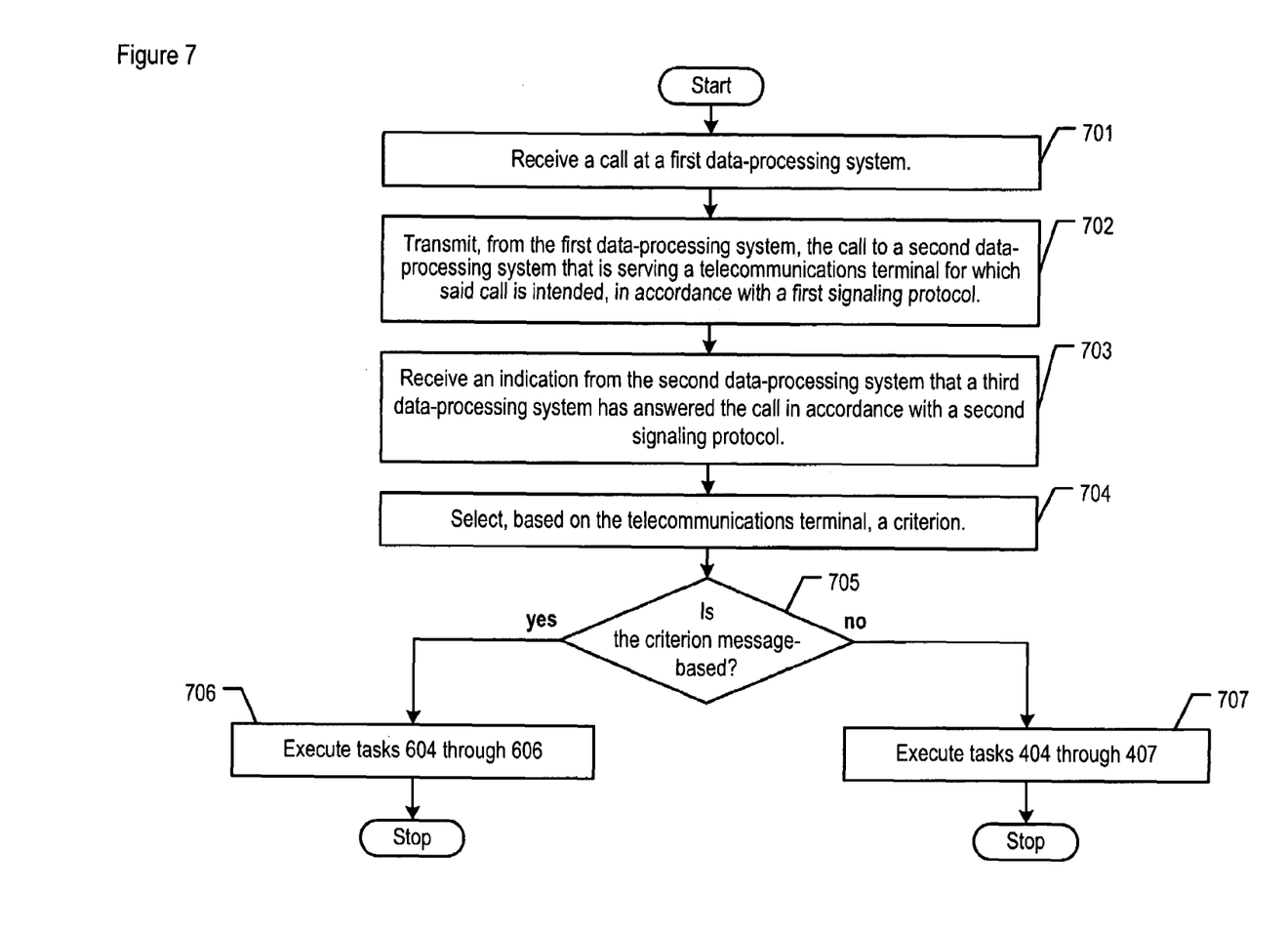
FIG. 7 depicts a flowchart of the salient tasks associated with determining, based on one or more criteria, that a voice mail system has answered a call, in accordance with the illustrative embodiment of the present invention.

FIG. 7 depicts a flowchart of the salient tasks associated with determining, based on one or more criteria, that a voice mail system has answered a call, in accordance with the illustrative embodiment of the present invention. It will be clear to those skilled in the art which tasks depicted in FIG. 7 can be performed simultaneously or in a different order than that depicted.

At task 701, a first-data processing system receives an incoming call (e.g., from terminal 211, etc.) in well-known fashion. For the purpose of teaching the tasks described with respect to FIG. 7, the first data-processing system is represented by private branch exchange 202, in accordance with the illustrative embodiment of the present invention.

Private branch exchange 202 determines, in well-known fashion, that the incoming call is to be extended to both an on-premises terminal (i.e., one of terminals 203) and an off-premises terminal (i.e., one of terminals 210). For the purpose of teaching the described tasks, it is assumed that private branch exchange 202 selects on-premises terminal 203-2 and off-premises terminal 210-2 to which to extend the call.

As part of extending the call to terminal 210-2, at task 702 private branch exchange 202 transmits the call to a second data-processing system, in well-known fashion. For the purpose of teaching the described tasks, the second data-processing system is represented by mobile switching center 208, in accordance with the illustrative embodiment of the present invention. Mobile switching center 208 is serving the telecommunications terminal (i.e., terminal 210-2) for which the call is intended. Private branch exchange 202 transmits the call to mobile switching center 208 using a first signaling protocol (e.g., ISDN, etc.).

At task 703, private branch exchange 202 receives an indication from mobile switching center 208 a third data-processing system has answered the call in accordance with a second signaling protocol. For example, telecommunications terminal 210-2 or cellular voice mail system 209 might have answered the call, in well-known fashion.

In accordance with the illustrative embodiment of the present invention, at task 704 private branch exchange 202 selects, based on the telecommunications terminal for which the call is intended (i.e., terminal 210-2), one or more criteria with which to make a decision on whether the non-enterprise voice mail system has answered the call. Two examples of criteria selection are presented here.

In the first example, private branch exchange 202 determines that terminal 210-2 is based on the Global System for Mobile Communications (GSM) protocol. GSM, along with some other cellular protocols (e.g., iDEN, etc.), is based on an ISDN end-to-end call model. Therefore, private branch exchange 202 might select criteria that involve basing the call answer decision on message protocols, described above and with respect to the tasks of FIG. 6. Private branch exchange 202 determines the protocol type (i.e., GSM) of terminal 210-2 by retrieving the protocol type from memory 303. As those who are skilled in the art will appreciate, there are other ways to determine the protocol type of terminal 210-2 (e.g., by querying mobile switching center 208, etc.).

In the second example, private branch exchange 202 determines that terminal 210-2 is based on the IS-95 Code Division Multiple Access (CDMA) protocol. CDMA, along with some other cellular protocols, is not based on an ISDN end-to-end call model. Therefore, private branch exchange 202 would select one or more criteria that involve basing the call answer decision on something other than message protocols, such as time intervals between relevant events. Time interval-based decision-making is described above and with respect to the tasks of FIGS. 4, 5A, and 5B.

Although the examples described above relate to the protocol type of terminal 210-2, it will be clear to those skilled in the art how to base the selection of one or more decision-making criteria on a different characteristic of terminal 210-2 (e.g., its telephone number, etc.).

At task 705, private branch exchange 202 checks the criteria selected. If the criteria are message-protocol-based, task execution proceeds to task 706. Otherwise, task execution proceeds to task 707.

At task 706, private branch exchange 202 executes tasks 604 through 606.

At task 707, private branch exchange 202 executes tasks 404 through 407.

It is to be understood that the above-described embodiments are merely illustrative of the present invention and that many variations of the above-described embodiments can be devised by those skilled in the art without departing from the scope of the invention. For example, in this Disclosure, numerous specific details are provided in order to provide a thorough description and understanding of the illustrative embodiments of the present invention. Those skilled in the art will recognize, however, that the invention can be practiced without one or more of those details, or with other methods, materials, components, etc.

Furthermore, in some instances, well-known structures, materials, or operations are not shown or described in detail to avoid obscuring aspects of the illustrative embodiments. It is understood that the various embodiments shown in the Figures are illustrative, and are not necessarily drawn to scale. Reference throughout the disclosure to "one embodiment" or "an embodiment" or "some embodiments" means that a particular feature, structure, material, or characteristic described in connection with the embodiment(s) is included in at least one embodiment of the present invention, but not necessarily all embodiments. Consequently, the appearances of the phrase "in one embodiment," "in an embodiment," or "in some embodiments" in various places throughout the Disclosure are not necessarily all referring to the same embodiment. Furthermore, the particular features, structures, materials, or characteristics can be combined in any suitable manner in one or more embodiments. It is therefore intended that such variations be included within the scope of the following claims and their equivalents.

What is claimed is:

1. A method comprising:
    transmitting, from a first data-processing system, a call to a second data-processing system;
    receiving, at the first data-processing system, an indication from the second data processing system that the call has been answered;
    ending, at the first data-processing system, the call to the second data processing system based on the time interval between:
    (i) when the call is transmitted to the second data processing system, and
    (ii) when the indication is received by the first data processing system that the call has been answered; and
    forwarding the call to a voice mail system that is associated with the first data-processing system, wherein the forwarding of the call is based on the time interval between:
    (i) when the call is transmitted to the second data processing system, and
    (ii) when the indication is received by the first data processing system that the call has been answered.

2. The method of claim 1 wherein the ending of the call to the second data processing system is based on the time interval being no greater than a threshold.

3. The method of claim 2 wherein the threshold is based on the second data-processing system.

4. The method of claim 1 wherein the first data-processing system is a private branch exchange and the second data-processing system is a mobile switching center.

5. The method of claim 1 further comprising receiving at the first data-processing system the call prior to the transmitting of the first signal.

6. A method comprising:
    transmitting, from a first data-processing system, a call to a second data-processing system in accordance with a first signaling protocol;
    receiving, at the first data-processing system, an indication from the second data processing system that a third data processing system has answered the call in accordance with a second signaling protocol;
    ending, at the first data-processing system, the call to the second data processing system when the second signaling protocol is different than the first signaling protocol; and
    forwarding the call to a voice mail system that is associated with the first data-processing system, when the second signaling protocol is different than the first signaling protocol.

7. The method of claim 6 wherein the first signaling protocol is based on the Integrated Services Digital Network set of protocols.

8. The method of claim 6 wherein the first data-processing system is a private branch exchange and the second data-processing system is a mobile switching center.

9. The method of claim 8 wherein the second data-processing system is based on the Global System for Mobile Communications.

10. The method of claim 8 wherein the third data-processing system is a voice mail system that is associated with the second data-processing system.

11. The method of claim 6 further comprising receiving at the first data-processing system the call prior to the transmitting of the call to the second data-processing system.

12. The method of claim 6 wherein the ending of the call to the second data-processing system is also based on the time interval between:
    (i) when the call is transmitted to the second data processing system, and
    (ii) when the indication is received by the first data processing system that the call has been answered.

13. A method comprising:
    transmitting, from a first data-processing system, a call to a second data-processing system that is serving a telecommunications terminal for which the call is intended;
    receiving, at the first data-processing system, an indication from the second data processing system that the call has been answered;
    ending, at the first data-processing system, the call to the second data processing system, based on i) receiving the indication and ii) a criterion that is based on a predetermined characteristic of the telecommunications terminal; and
    forwarding the call to a voice mail system that is associated with the first data-processing system, wherein the forwarding of the call is based on the criterion.

14. The method of claim 13 wherein the criterion is related to at least one of:
    (i) comparing the signaling protocol that is used to answer the call with the signaling protocol that is used to transmit the call; and
    (ii) the time interval between (a) when the call is transmitted to the second data processing system, and (a) when the indication is received by the first data processing system that the call has been answered.

15. The method of claim 14 wherein the signaling protocol that is used to transmit the call is based on the Integrated Services Digital Network set of protocols.

16. The method of claim 13 wherein the first data-processing system is a private branch exchange and the second data-processing system is a mobile switching center.

17. The method of claim 16 wherein the second data-processing system is based on the Global System for Mobile Communications.

* * * * *